US011652712B2

(12) United States Patent
Reineke et al.

(10) Patent No.: US 11,652,712 B2
(45) Date of Patent: May 16, 2023

(54) METHOD AND SYSTEM FOR NETWORK OPPORTUNITY DISCOVERY BASED ON SUBSCRIPTION AND HARDWARE VISIBILITY

(71) Applicant: EMC IP Holding Company LLC, Hopkinton, MA (US)

(72) Inventors: Nicole Reineke, Northborough, MA (US); Barbara Ballard, Needham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/446,376

(22) Filed: Aug. 30, 2021

(65) Prior Publication Data

US 2023/0062319 A1 Mar. 2, 2023

(51) Int. Cl.
*G06F 15/173* (2006.01)
*H04L 41/5061* (2022.01)
*H04L 41/5054* (2022.01)
*H04L 41/0893* (2022.01)
*H04L 41/12* (2022.01)
*H04L 41/18* (2022.01)

(52) U.S. Cl.
CPC ...... *H04L 41/5064* (2013.01); *H04L 41/0893* (2013.01); *H04L 41/12* (2013.01); *H04L 41/18* (2013.01); *H04L 41/5054* (2013.01)

(58) Field of Classification Search
CPC . H04L 41/5064; H04L 41/0893; H04L 41/12; H04L 41/18; H04L 41/5054
See application file for complete search history.

(56) References Cited

U.S. PATENT DOCUMENTS

2017/0104688 A1* 4/2017 Mirahsan .......... H04W 28/0289

* cited by examiner

*Primary Examiner* — Wing F Chan
*Assistant Examiner* — Joseph R Maniwang
(74) *Attorney, Agent, or Firm* — Workman Nydegger

(57) ABSTRACT

One example method includes various processes performed by a vendor system including discovering infrastructure assets of a subscriber system, determining that the vendor system is permitted by the subscriber system to access information about the infrastructure assets of the subscriber system, accessing the information about the infrastructure assets of the subscriber system, assessing an ability of the infrastructure assets of the subscriber system to implement a service offering of the vendor system, and the assessing is based on the information about the infrastructure assets, and implementing the service offering in the infrastructure assets of the subscriber system when (i) given permission to do so by the subscriber system and (ii) the infrastructure assets have been determined to be able to implement the service offering.

20 Claims, 3 Drawing Sheets

METHOD AND SYSTEM FOR NETWORK OPPORTUNITY DISCOVERY BASED ON SUBSCRIPTION AND HARDWARE VISIBILITY

FIELD OF THE INVENTION

Embodiments of the present invention generally relate to infrastructure evaluation and management. More particularly, at least some embodiments of the invention relate to systems, hardware, software, computer-readable media, and methods for evaluating an infrastructure and, based on the evaluation, identifying new capabilities and potential uses of the infrastructure.

BACKGROUND

Enterprises such as public and private businesses often have a variety of hardware and software assets that have been purchased to help achieve various needs and goals of the enterprise. As well, enterprises may have access, such as by way of subscriptions or other business arrangements, to third party assets such as communication networks, for example, that may work together, and be integrated to some extent, with the enterprise assets. While these various assets are useful and helpful to the enterprise, it is often the case that the assets present opportunities that are not apparent to the enterprise and/or that the enterprise is unable to take advantage of.

For example, IT departments typically manage their telecommunications network providers (telco) separately from their IT infrastructure, which may include the enterprise data center, near-edge, personal, and edge device, networks. Edge device networks may include campus wi-fi, and factory floors, for example. However, the IT department does not take advantage of telemetry awareness, edge device and software deployment capabilities, and central IT management tools as related to their networks. This approach to infrastructure and telco services/hardware may introduce problems with billing, cost allocation, and IT management.

Another problem with current approaches relates to so-called MNVOs (Mobile Virtual Network Operators). Briefly, an MNVO may contract with a third party to use a third party infrastructure, such as a telco network, to offer and provide services to MNVO subscribers. In order to do this, the MNVO employs information concerning the telco infrastructure. However, traditional MVNOs do not take into account what is considered IT infrastructure and automatically identify and generate meaningful offerings across organizations, data center, near-edge, personal and edge devices. Further, traditional network providers do not utilize extensive topological data as available in an IT infrastructure management and device management interfaces , nor do they have access to corporate devices and provisioning processes.

A further problem with conventional approaches concerns the fact that SD-LAN solutions may not realize cost benefits when paired with traditional telecom offerings. Particularly, several vendors offer a SD-LAN solution, finding optimized routes in edge networks. However, most cellular pricing models have high per-device fees, reducing benefits from pooled data, if available.

One final example of a problem with conventional approaches concerns the fact that companies without access to end user license agreement (EULA) rights-of-use of hardware details cannot take advantage of asset awareness. Further, AI ethics issues require the validation of license agreements to ensure that data can be utilized for the purpose of sales.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
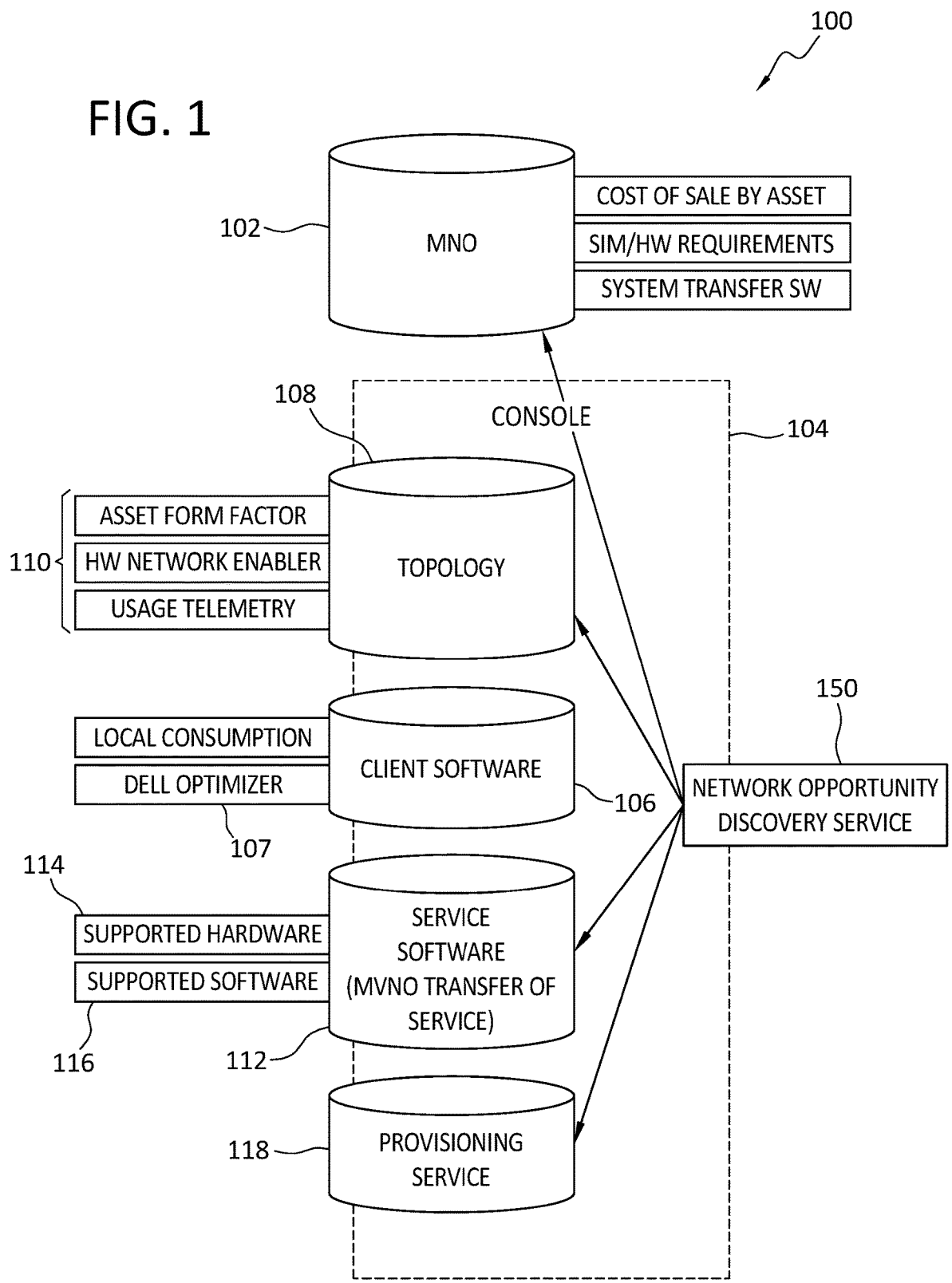
FIG. 1 discloses aspects of an example architecture according to some embodiments.

Embodiments of the present invention generally relate to infrastructure evaluation and management. More particularly, at least some embodiments of the invention relate to systems, hardware, software, computer-readable media, and methods for evaluating an infrastructure and, based on the evaluation, identifying new capabilities and potential uses of the infrastructure.

In general, example embodiments of the invention may be implemented in connection with an enterprise environment that may include enterprise infrastructure assets such as hardware and software. Some or all of the assets may have been provided to the enterprise, and maintained, by a vendor. The vendor may have license agreements in place with the enterprise concerning those assets and, as a result, the vendor may have access to information, such as information concerning the structure and operation of the enterprise infrastructure, that is not available or accessible to other parties. This information may be referred to as topological asset data. The vendor may access, analyze, and utilize, the topological detailed asset data of the enterprise to make informed, automated network sales offerings to the enterprise and, upon acceptance of an offering by the enterprise, the vendor may enable the automated onboarding of devices into the enterprise infrastructure for such offerings. As well, the vendor may automatically update its analysis and sales offerings in response to vendor-related changes, and/or other changes, to the enterprise infrastructure. The various services noted here, and elsewhere herein, may be provided by the vendor to the enterprise on a subscription basis, and/or on an ad-hoc basis, for example.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an enterprise may be made aware of capabilities and functionalities of its infrastructure that are not readily apparent to the enterprise. In this way, more effective and efficient use may be made, by the enterprise, of the enterprise infrastructure. An embodiment may provide for automatic generation of recommendations concerning infrastructure changes and refinements for improved performance, and these changes and refinements may be implemented with little or no involvement required on the part of the vendor. Various other advantageous aspects of example embodiments will be apparent from this disclosure.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which an enterprise infrastructure, which may comprise a large number and variety of hardware and software assets, and whose size, configuration, and scope, may be changing unpredictably and on an ongoing basis, may be evaluated and analyzed by an entity such as an analysis platform. It is simply not practical, nor possible, for a human to effectively and efficiently perform such analyses, at least in view of such environmental conditions. Accordingly, nothing herein should be construed as teaching or suggesting that any aspect of any embodiment of the invention could or would be performed, practically or otherwise, in the mind of a human. Further, and unless explicitly indicated otherwise, the disclosed methods, processes, and operations, are contemplated as being implemented by computing systems that may comprise hardware and/or software. That is, such methods processes, and operations, are defined as being computer-implemented.

A. Overview

Example embodiments may enable a vendor or other party to turn its IT service and asset awareness, that is awareness of customer infrastructure, into a light MVNE (Mobile Virtual Network Enabler)/MVNO provider with zero-touch provisioning that does not require any human intervention. Particularly, the vendor, such as by way of a vendor hardware and/or software platform, may leverage the extensive topography and topology information the vendor has, or can obtain, concerning the enterprise infrastructure. Because part or all of the infrastructure may have been provided by the vendor, the vendor may be uniquely positioned to access and use such information to enhance the capabilities and operation of the vendor infrastructure. In fact, such information may not be available or accessible to any parties other than the vendor and the enterprise.

Note that as used herein, an MVNE may take the form of an entity, such as a company, that may provide network infrastructure and related services to a MNVO. Such infrastructure and services may include, but are not limited to, business support systems, administration, and operations support systems. An MNVO may be, for example, a branded reseller MNVO that may be thought of as an organization that defines meaningful offers for their customer base, often hyper-focused and geographically bound. The MNVO may collect money from its subscribers without ever having to own or operate an actual network. Some example MNVOs include Google Fi, Boost Mobile, and Tracfone. These MNVOs may create offers to their subscribers based on what the MNVO knows about their region of operations, and customer base. Reference may also be made herein to an MNO (Mobile Network Operator), such as Vodafone or Verizon for example. An MNVO may resell capacity of an MNO.

In contrast with such conventional approaches, example embodiments may be implemented by and/or in connection with infrastructure/client device vendors, such as Dell Technologies for example, who may have a wide reach, that is, knowledge and insight, into all infrastructure devices and peripheral devices of an enterprise, that is, a customer of the vendor. Such vendors may also have a unique ability to control and provision software onto the assets of the enterprise. More specifically, the vendor may be uniquely positioned to make informed decisions based on the assets and asset details of an organization, the asset details, and then take automated action with respect to the assets so as to improve, for example, the functionality and/or operation of the assets. Such automated action may comprise, for example, SIM and vSIM updates, and those updates may be delivered, possibly automatically, by the vendor to the customer or other enterprise by way of a zero-touch provisioning (ZTP) process that does not require any involvement by a human. In this way, example embodiments may leverage the unique asset and topology awareness and control abilities of a vendor or other entity to enable the vendor to automatically detect, streamline offer, and kick off zero-touch provisioning. Thus, according to some embodiments, the vendor may act as an MVNO, MVNE, or branded reseller MVNO, for example.

B. Aspects of An Example Architecture and Operating Environment

With reference now to the example of FIG. 1, a high level depiction of an example architecture 100 is disclosed in connection with which some embodiments of the invention may be implemented. As shown, the architecture 100 may include an MNO 102. The MNO may be in a partnership to resell some or all of its capacity, such as to one or more MVNOs for example. There may be a variety of considerations relating to the resale of capacity by the MNO. For example, the cost of the capacity that is to be resold may be based in whole or in part on the type(s) of hardware that will use the capacity, and/or based on the typical behavior of the device(s) that will use the capacity. As well, system transfer software may be needed, such as for a device SIM update for example, so as to enable device hardware updates that will be required for the device to transfer to, and function with, a new provider, or MNO. In some instances, the MNO, or new provider, may operate a private 5G network, such as a network that implements O-RAN (Open Radio Access Network).

An IT portal, such as the console 104 for example, may enable access, such as by a vendor, to a variety of information and data concerning the infrastructure assets, which may comprise hardware and/or software, of an enterprise such as a customer of the vendor. The console 104 may be implemented, such as by a vendor, in a web service provider platform that provides cloud-based services, such as Dell Technologies APEX for example, although that is not necessarily required. Information and data that may be accessed by way of the console 104 may include, for example, software provisioning information for vendor assets, such as what client software 106 has been provisioned to which assets, and topology data 108 for customer assets under management by the vendor. In more detail, the client software 106 may comprise, for example, various software platforms, such as Dell Optimizer 107 for example, provided by a vendor and locally consumed, that is, operated, at the customer site.

Topology data 108 may be accessed directly at assets, or at secondary sources that include topology data 108, by way of the console 104, such as on a per-asset basis, although that is not necessarily required. Some examples of topology data 108 may include, but are not limited to, asset details 110 such as the asset form factor or type of asset, such as a client device, edge device, IoT device, for example. The topology data 108 may include asset details 110 that identify the type and capabilities virtual assets of the customer, such as VMs (Virtual Machines) for example. As well, example topology data 108 may include asset details 110 concerning hardware assets, an example of which is information regarding a network enabler (like an edge data center) or a network connecter such as a SIM (Subscriber Identification Module) card. The asset details 110 may include usage telemetry for one or more assets such as, for example, when the asset is used, for how long, and bandwidth used by the asset.

The console 104 may also enable local access, that is, access at the site where the console 104 is located, to service software 112 for implementing an MVNO transfer of service, such as by supported asset enabler hardware. The service software 112 may specify, for example, which hardware 114 and software 116 are supported by the service software 112. The supported hardware 114 may include asset enabler hardware. The service software 112 may be copied directly from the MNO, or stored in a local data store at the site where the console 104 is located, and operates from. Finally, the console 104 may have access to a provisioning service 118 that may be used to automatically provision assets provided by a vendor to a customer.

As indicated in FIG. 1, the various aspects of the console 104 and other elements may enable the implementation and operation of a NODS (Network Opportunity and Discovery Service) 150. Aspects of an example NODS implementation are addressed in the discussion of FIG. 2 below.

C. Aspects of An Example NODS Implementation and Processes

Figure 2:
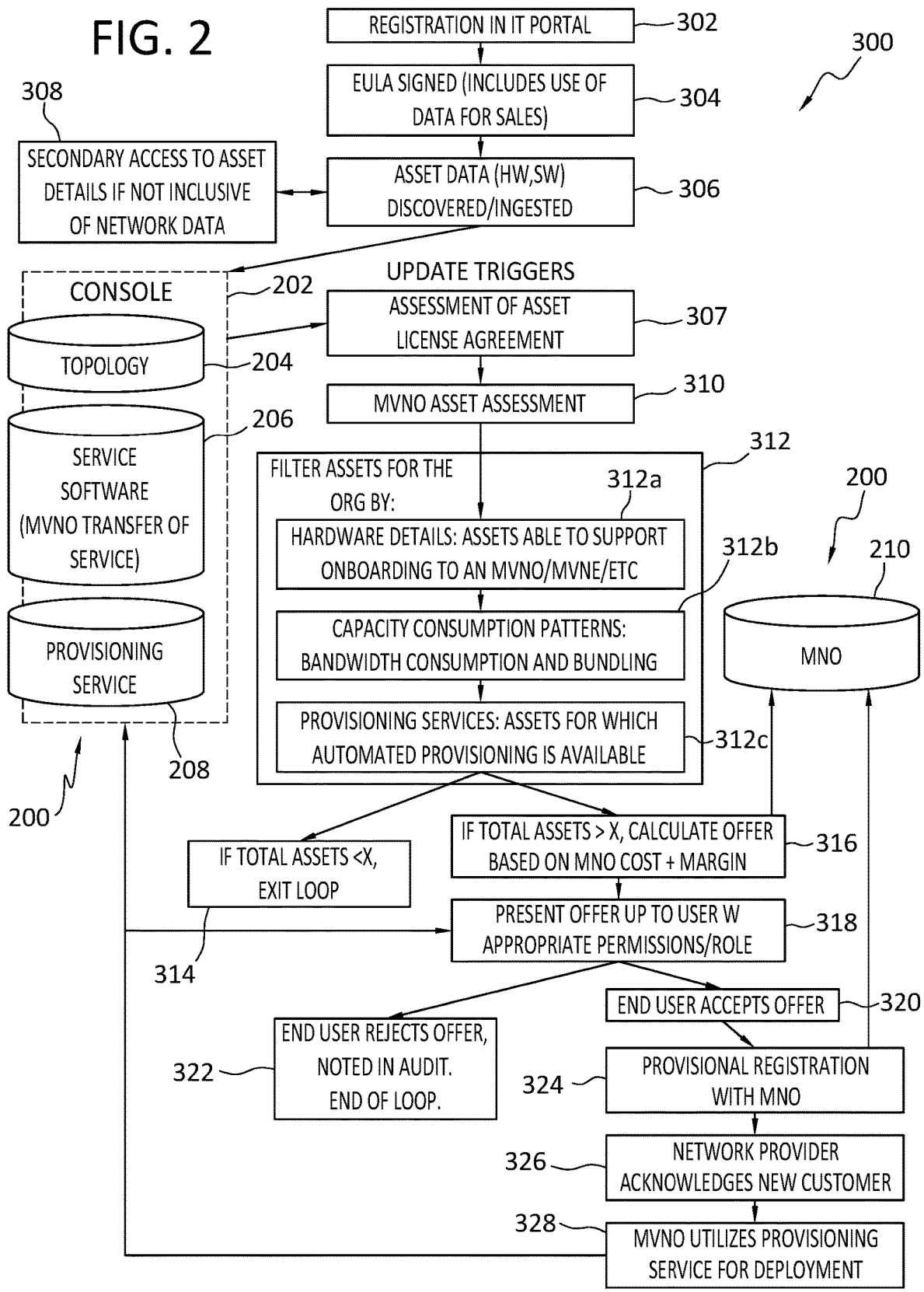
FIG. 2 discloses aspects of an example architecture and method according to some embodiments.

With attention now to FIG. 2, details are provided concerning elements of an example architecture 200 within which an implementation a NODS method 300 may be implemented. As the architecture 200 may be similar, or identical, to the architecture 100, the discussion of FIG. 2 largely concerns the NODS method 300. Note that any single element, or all, of the NODS method 300 may be performed across only a single subscriber, or across multiple subscribers. This may be useful in circumstances where, for example, infrastructure assets of multiple subscribers can be pooled to support and implement an offer of new functionality by a vendor.

Briefly, the architecture 200 may include a console 202 by way of which topology 204, service software 206, and a provisioning service 208, may be accessed and/or implemented. As well, an MNO entity 210 may be an element of the architecture 200, as noted in the discussion of the NODS method 300, which may simply be referred to as the method 300, below.

The NODS may be implemented 302 as part of a customer, or subscriber, IT portal, such as the console 202 for example. For each subscriber in a vendor subscriber base, NODS may perform various functions, services, and operations. For example, NODS may check 304 for subscriber assets which are not prohibited by the EULA (End User License Agreement) for use in sales or marketing activities, such as may be proposed or undertaken by a vendor. That is, if a subscriber has not executed a EULA, the vendor may not be permitted to access subscriber assets and information concerning those assets. Thus, this initial check 304 may help the vendor avoid legal and ethical problems regarding the potential provision of services to the subscriber.

Next, and assuming suitable permissions, such as EULAs, are in place between the subscriber and vendor, NODS may access, and ingest, information 306 about the infrastructure assets of the subscriber for which permission has been given by the subscriber. In some instances, 306 may be triggered, and performed automatically, each time a new EULA or other authorization is put in place, for example, as a result of the installation of new/modified hardware and/or software in the subscriber infrastructure. Thus, there may be an ongoing, or ad-hoc, assessment 307 by NODS of asset license agreements. The information collected 306 concerning the infrastructure assets may be stored at the site from which the console 202 operates and/or at other sites, such as the subscriber site for example. In some instances, the information may be collected 308 from a secondary site if that information is not available directly from the subscriber.

The next part of the example method 300 concerns subscriber infrastructure asset assessment 310. The assessment 310 may involve applying various filters 312 to the asset information that was gathered 306 concerning subscriber infrastructure assets. In general, the application 312 of the filters may be performed, on a single subscriber basis or across multiple subscribers, to determine which of the infrastructure assets may meet criteria specified by a vendor or MVNO. As discussed below, a determination that subscriber infrastructure assets meet specified criteria may result in a conclusion by NODS that the subscriber infrastructure is adequate to support one or more services that may be offered by the vendor.

More particularly, one example filter that may be applied 312 may concern subscriber infrastructure hardware. Particularly, the filter 312a may identify subscriber infrastructure hardware that can support onboarding of new functionality to the subscriber by a vendor such as an MVNO, MVNE, or other entity. Examples of such hardware may include, but are not limited to, SIM card, network access device, and device version. This information may be readily obtainable through hardware BOM (Bill of Material) and asset descriptors that may be available in the public domain.

Another example of a filter that may be applied 312 to subscriber infrastructure information is a capacity consumption filter 312b. Application of this filter 312b to the subscriber infrastructure information may help to identify where, in the subscriber infrastructure, bandwidth is being consumed, when, and by what entities. Application of the filter 312b may also help to identify whether, and where, bandwidth of multiple infrastructures systems and/or devices is being bundled, or could be bundled to achieve efficiencies.

A further example of a filter that may be applied 312 to subscriber infrastructure information is a provisioning services filter 312c. Application of the filter 312c may identify subscriber assets for which automated provisioning is available. Such assets may be good candidates for ZTP since the vendor may be able to provision those assets, automatically, without requiring any involvement on the part of the subscriber. That is, application of the filter 312c may enable identification of subscriber infrastructure assets that are supported by automation and ZTP services to ensure identified assets can be automatically onboarded with no interruption of service. It is noted that ZTP, PaaS, and other edge device management pipelines, may be documented with IT management consoles such as the console 202 and may be used by the console 202 when NODS is performed.

After filtering 312 is complete, and various subscriber infrastructure assets have been identified, a determination may be made as to whether or not the subscriber has adequate infrastructure assets to provide at least a minimum profit to the vendor if an offer is made. For example, a vendor such as a MVNO may decide that it will not make an offer to a subscriber unless the offer is expected to generate at least $500 per month for the vendor. Given this threshold, and the knowledge that the vendor has about the subscriber infrastructure, the vendor can determine whether the subscriber infrastructure is of the right type and amount to make the offer profitable for the vendor, if the offer were made. If the subscriber infrastructure is determined to be inadequate 314, then the method 300 may end, with no offer generated or made. On the other hand, if the vendor determines 316 that the subscriber infrastructure is of the right type and amount to make the offer profitable for the vendor, if the subscriber were to accept the offer, then an offer, or promotion, may be generated and presented 318 to the subscriber.

Note that the adequacy, or not, of subscriber infrastructure may be determined on any suitable basis. For example, a subscriber who has X number of edge devices may be deemed by the vendor to have adequate infrastructure to at least merit consideration of a possible offer to that subscriber, while a subscriber who has <X edge devices may be deemed to lack adequate infrastructure to justify an offer by the vendor. As well, profitability, or not, may be determined in any suitable way. By way of illustration, and not limitation, a vendor might determine that an offer that would net at least $500/month to the vendor, with a 20% profit over cost (to the vendor), is sufficiently profitable to justify making an offer to the subscriber.

With continued reference to a promotion that may be made by a vendor to one or more subscribers, a promotion may comprise one or more offers, such as by a vendor acting as an MVNO for example, to implement, by the vendor, changes to hardware and/or software assets of a subscriber infrastructure, where such changes may result, for example, in an improvement in the capability, efficiency, functionality, and/or operation, of the assets and the subscriber infrastructure. For example, an offer may identify a way that the vendor can improve bandwidth usage efficiency in the subscriber infrastructure by installing software and/or hardware on some of the devices, such as edge devices for example, in the subscriber infrastructure. Another example of an offer is a service provided by a vendor to which the subscriber can subscribe. By subscribing to the service, the subscriber may be able to improve the capability, efficiency, functionality, and/or operation, of its infrastructure assets.

Another example of an offer made by a vendor may be one in which a subscriber has underutilized hardware and/or software infrastructure that could be employed by a third party. In this example, the vendor may orchestrate the provision, or at least the offer of, that capability to the third party, on terms acceptable to the subscriber, vendor, and third party. Thus, the vendor may realize a profit in orchestrating the arrangement, while the subscriber is compensated for the use of its infrastructure, on terms acceptable to the subscriber, and the third party obtains the use of needed infrastructure without having to purchase that infrastructure. Such terms may include legal terms such as EULA acceptances, security terms and constraints, and financial terms, for example.

The promotion may be offered 318 to the subscriber, based the vendor having received any necessary permissions and authorizations from the subscriber to modify subscriber hardware and/or software. As noted earlier herein, a promotion may be based on the cost, to the vendor, of providing the service to the subscriber, and also based on a minimum profit margin defined by the vendor. Various considerations may go into the generation of a promotion. For example, a promotion may consider the opportunities to pool capacity or bandwidth across multiple devices and/or multiple subscribers, for efficiency of scale. As another example, a promotion may consider bandwidth, or processing resource, consumption at peak and off-peak times. As another example, a promotion may consider opportunities for network hardware installation for a private 5G network of a subscriber.

After an offer has been made 318 by a vendor, the subscriber may either accept 320, or reject 322, the offer. If the offer is rejected 322 by the subscriber, the method 300 may terminate. On the other hand, if the offer is accepted by the subscriber, NODS may initiate registration 324 of the subscriber, and subscriber infrastructure, with the vendor, which may be an entity such as an MNO 210 for example. Upon acknowledgement 326 and registration 324 of the subscriber by the vendor, the NODS may schedule service software to download to the hardware assets within those subscriber assets with which the offer 318 is concerned. The particular service software needed may have been identified during the offer generation 316 process. Scheduling of the service software to download may be accomplished through a software management service available in an IT edge management portal. After the hardware assets, such as SIM cards and other hardware assets for example, have been provisioned 328 with the service software, the downloaded service software may then configure the hardware assets to which it has been provisioned 328.

As will be apparent from this disclosure, example embodiments may enable a vendor such as a MVNO to leverage its IT service to discover and deliver, via a network, rebranded MVNO services or other variants of network services with ZTP, and no sales person intervention.

D. Aspects of the Disclosed Methods

It is noted with respect to the example method of FIG. 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Further Discussion

As will be apparent from this disclosure, example embodiments of the invention may implement various useful features and functionalities. Any one or more of such features and functionalities may be combined in any way in a given embodiment.

For example, embodiments may use (i) hardware awareness capabilities concerning, for example, edge devices, tablets and laptops, near-edge, and central assets including server, PCs, or other data center hardware, including hardware capabilities, (ii) user 'use of data' license agreement awareness, and (iii) MVNO asset support and cost data, for example, to determine viability of a network offering for a minimum number of devices in near-real-time. As another example, embodiments may, further to the aforementioned functionalities, automate customized pricing offering as an MVNO building on network cost records to customers for all registered assets for first-mover advantage for a vendor.

Embodiments may provide for monitoring customer acceptance of a vendor offer and MVNO acceptance of new client request, and as well as automation of the deployment of upgrade software to subscriber assets for seamless delivery.

As another example, embodiments may employ usage telemetry as an input to make determinations concerning price modeling for example, that is, for determining a price associated with a particular offer.

Finally, some example embodiments may enable the bundling, at a subscriber, of SD-LAN with cellular connectivity. That is, an example vendor offer may operate to bundle a subscriber SD-LAN with cellular, or telco, connectivity.

In one illustrative use case, an IT system/software provider may operate as a rebranded MVNO. The MVNO may have various capabilities. For example, the MVNO may be able to offer fully branded, automated experience for customers with more than 'XX' stated assets that have minimum acceptable hardware capabilities. As well, the MVNO may be able to detect offer opportunities and viability at the moment of subscriber hardware registration within an IT environment. Finally, an MVNO may have the ability to take advantage of best-in-breed deployment mechanisms for assets within an IT environment and apply those mechanisms to network transition.

F. Further Example Embodiments

Following are some further example embodiments of the invention. These are presented only by way of example and are not intended to limit the scope of the invention in any way.

Embodiment 1. A method, comprising: discovering, by a vendor system, infrastructure assets of a subscriber system; determining, by the vendor system, that the vendor system is permitted by the subscriber system to access information about the infrastructure assets of the subscriber system; accessing, by the vendor system, the information about the infrastructure assets of the subscriber system; assessing, by the vendor system, an ability of the infrastructure assets of the subscriber system to implement a service offering of the vendor system, and the assessing is based on the information about the infrastructure assets; and implementing, by the vendor system, the service offering in the infrastructure assets of the subscriber system when (i) given permission to do so by the subscriber system and (ii) the infrastructure assets have been determined to be able to implement the service offering, and implementing the service offering improves an operation, efficiency, and/or, functionality of the infrastructure assets relative to what the operation, efficiency, and/or, functionality were prior to implementation of the service offering.

Embodiment 2. The method as recited in embodiment 1, wherein the service offering is implemented automatically without any human involvement at the subscriber system.

Embodiment 3. The method as recited in any of embodiments 1-2, wherein determining that the vendor system is permitted by the subscriber system to access information about the infrastructure assets of the subscriber system comprises determining whether any license agreements are in place between the vendor system and the subscriber system, and determining which infrastructure assets of the subscriber system are covered by the license agreements.

Embodiment 4. The method as recited in any of embodiments 1-3, wherein when an assessment is made by the vendor system that the infrastructure assets of the subscriber system are unable to implement a service offering of the vendor system, no offering is made by the vendor system to the subscriber system.

Embodiment 5. The method as recited in any of embodiments 1-4, wherein the vendor is a MVNO.

Embodiment 6. The method as recited in any of embodiments 1-5, wherein assessing the information about the infrastructure assets of the subscriber system comprises applying one or more filters to the information to determine hardware and/or operational details about the infrastructure assets.

Embodiment 7. The method as recited in embodiment 6, wherein the one or more filters comprises one or more of a hardware details filter, a capacity consumption filter, and a provisioning services filter.

Embodiment 8. The method as recited in any of embodiments 1-7, wherein the service offering implemented, by the vendor system in the infrastructure assets of the subscriber system, meets or exceeds a minimum profitability acceptable to the vendor system.

Embodiment 9. The method as recited in any of embodiments 1-8, wherein the infrastructure asserts of the subscriber are supplied by the vendor system.

Embodiment 10. The method as recited in any of embodiments 1-9, wherein the infrastructure assets of the subscriber system comprise hardware and/or software.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
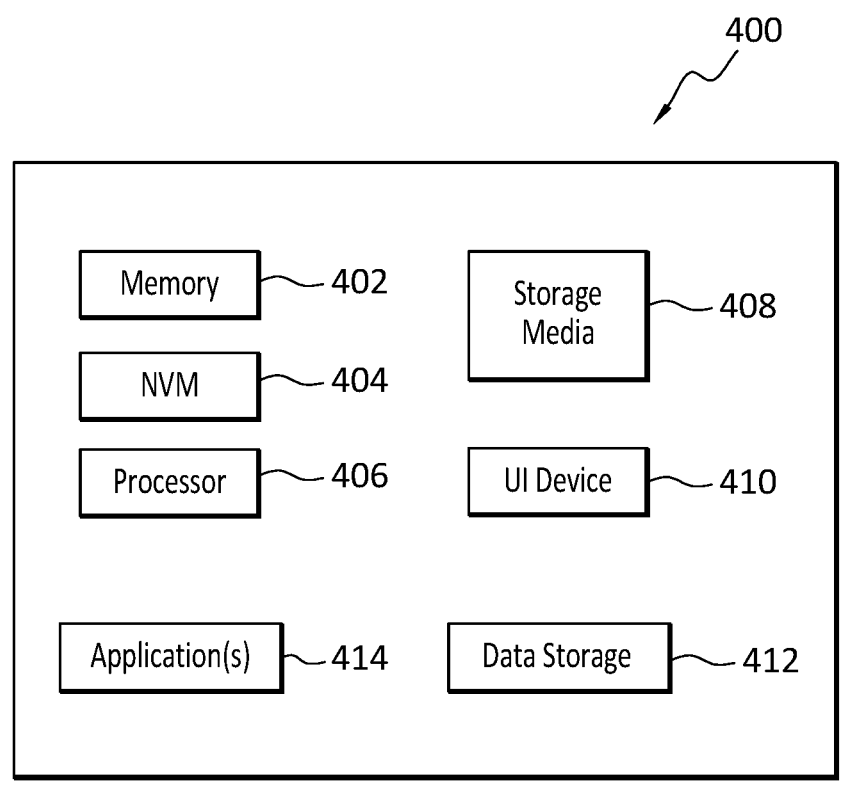
FIG. 3 discloses aspects of an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 3.

In the example of FIG. 3, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
discovering infrastructure assets of a subscriber system;
determining that the subscriber system has authorized access to information about the infrastructure assets of the subscriber system;
accessing the information about the infrastructure assets of the subscriber system;
assessing an ability of the infrastructure assets of the subscriber system to implement a service offering of a vendor, and the assessing is based on the information about the infrastructure assets; and
implementing the service offering in the infrastructure assets of the subscriber system when (i) given permission to do so by the subscriber system and (ii) the infrastructure assets have been determined to be able to implement the service offering, wherein implementing the service offering improves an operation, efficiency, and/or, functionality of the infrastructure assets relative to what the operation, efficiency, and/or, functionality were prior to implementation of the service offering.

2. The method as recited in claim 1, wherein the service offering is implemented automatically without any human involvement at the subscriber system.

3. The method as recited in claim 1, wherein determining that the subscriber system has authorized access to information about the infrastructure assets of the subscriber system comprises determining whether any license agreements are in place between the vendor and the subscriber system, and determining which infrastructure assets of the subscriber system are covered by the license agreements.

4. The method as recited in claim 1, wherein when an assessment is made that the infrastructure assets of the subscriber system are unable to implement a service offering of the vendor, no offering is made to the subscriber system.

5. The method as recited in claim 1, wherein the vendor is a MVNO.

6. The method as recited in claim 1, wherein assessing the information about the infrastructure assets of the subscriber system comprises applying one or more filters to the information to determine hardware and/or operational details about the infrastructure assets.

7. The method as recited in claim 6, wherein the one or more filters comprises one or more of a hardware details filter, a capacity consumption filter, and a provisioning services filter.

8. The method as recited in claim 1, wherein the service offering implemented in the infrastructure assets of the subscriber system, meets or exceeds a minimum profitability acceptable to the vendor.

9. The method as recited in claim 1, wherein the infrastructure assets of the subscriber system are supplied by the vendor.

10. The method as recited in claim 1, wherein the infrastructure assets of the subscriber system comprise hardware and/or software.

11. A non-transitory computer readable storage medium having stored therein instructions that are executable by one or more hardware processors to perform operations comprising:
  discovering infrastructure assets of a subscriber system;
  determining that the subscriber system has authorized access to information about the infrastructure assets of the subscriber system;
  accessing the information about the infrastructure assets of the subscriber system;
  assessing an ability of the infrastructure assets of the subscriber system to implement a service offering of a vendor, and the assessing is based on the information about the infrastructure assets; and
  implementing the service offering in the infrastructure assets of the subscriber system when (i) given permission to do so by the subscriber system and (ii) the infrastructure assets have been determined to be able to implement the service offering, wherein implementing the service offering improves an operation, efficiency, and/or, functionality of the infrastructure assets relative to what the operation, efficiency, and/or, functionality were prior to implementation of the service offering.

12. The non-transitory computer readable storage medium as recited in claim 11, wherein the service offering is implemented automatically without any human involvement at the subscriber system.

13. The non-transitory computer readable storage medium as recited in claim 11, wherein determining that the subscriber system has authorized access to information about the infrastructure assets of the subscriber system comprises determining whether any license agreements are in place between the vendor and the subscriber system, and determining which infrastructure assets of the subscriber system are covered by the license agreements.

14. The non-transitory computer readable storage medium as recited in claim 11, wherein when an assessment is made that the infrastructure assets of the subscriber system are unable to implement a service offering of the vendor, no offering is made to the subscriber system.

15. The non-transitory computer readable storage medium as recited in claim 11, wherein the vendor is a MVNO.

16. The non-transitory computer readable storage medium as recited in claim 11, wherein assessing the information about the infrastructure assets of the subscriber system comprises applying one or more filters to the information to determine hardware and/or operational details about the infrastructure assets.

17. The non-transitory computer readable storage medium as recited in claim 16, wherein the one or more filters comprises one or more of a hardware details filter, a capacity consumption filter, and a provisioning services filter.

18. The non-transitory computer readable storage medium as recited in claim 11, wherein the service offering implemented, in the infrastructure assets of the subscriber system, meets or exceeds a minimum profitability acceptable to the vendor.

19. The non-transitory computer readable storage medium as recited in claim 11, wherein the infrastructure assets of the subscriber system are supplied by the vendor.

20. The non-transitory computer readable storage medium as recited in claim 11, wherein the infrastructure assets of the subscriber system comprise hardware and/or software.

* * * * *